US006735505B2

(12) United States Patent
Levine

(10) Patent No.: US 6,735,505 B2
(45) Date of Patent: May 11, 2004

(54) AIRCRAFT FLIGHT AND VOICE DATA RECORDER SYSTEM AND METHOD

(75) Inventor: Howard B. Levine, San Marcos, CA (US)

(73) Assignee: Cubic Defense Systems, Inc., San Diego, CA (US)

( * ) Notice: Subject to any disclaimer, the term of this patent is extended or adjusted under 35 U.S.C. 154(b) by 0 days.

(21) Appl. No.: 10/052,202

(22) Filed: Jan. 17, 2002

(65) Prior Publication Data

US 2003/0135311 A1 Jul. 17, 2003

(51) Int. Cl.$^7$ .............................. G11B 5/02; G06F 15/74
(52) U.S. Cl. ................................ 701/35; 701/2; 701/3; 340/439; 340/963; 342/357.01; 244/158 R; 244/76 R
(58) Field of Search ............................... 701/35, 36, 14, 701/29, 2, 3, 15, 16; 340/439, 963, 945, 961, 539, 947, 951, 971, 973; 342/357.01, 455, 32; 244/158 R, 76 R; 455/66

(56) References Cited

U.S. PATENT DOCUMENTS

| | | | | |
|---|---|---|---|---|
| 4,460,964 A | * | 7/1984 | Skutecki et al. ......... 244/17.13 |
| 4,729,102 A | | 3/1988 | Miller, Jr. et al. ............... 360/5 |
| 5,289,377 A | * | 2/1994 | Yokote et al. ................. 701/35 |
| 5,798,458 A | | 8/1998 | Monroe ........................ 73/587 |
| 6,009,356 A | | 12/1999 | Monroe ........................ 701/14 |
| 6,092,008 A | | 7/2000 | Bateman ...................... 701/14 |
| 6,160,998 A | | 12/2000 | Wright et al. ................. 455/66 |
| 6,163,681 A | | 12/2000 | Wright et al. ................. 455/66 |
| 6,167,238 A | | 12/2000 | Wright ......................... 455/66 |
| 6,167,239 A | | 12/2000 | Wright et al. ................. 455/66 |
| 6,173,159 B1 | | 1/2001 | Wright et al. ................. 455/66 |
| 6,262,659 B1 | | 7/2001 | Korkosz et al. ............. 340/539 |
| 6,308,044 B1 | | 10/2001 | Wright et al. ................. 455/66 |
| 6,308,045 B1 | | 10/2001 | Wright et al. ................. 455/66 |
| 6,385,513 B1 | * | 5/2002 | Murray et al. ................ 701/14 |
| 6,477,152 B1 | | 11/2002 | Hiett .......................... 370/316 |
| 2002/0004695 A1 | | 1/2002 | Glenn et al. .................. 701/35 |
| 2002/0035416 A1 | | 3/2002 | De Leon ...................... 701/14 |

FOREIGN PATENT DOCUMENTS

| | | | | |
|---|---|---|---|---|
| DE | 200 14 969 U1 | 3/2001 | ........... B64D/45/00 |
| WO | WO 99/31575 | 6/1999 | ............. G06F/7/70 |
| WO | WO 01/60693 A2 | 8/2001 | ........... B64D/45/00 |
| WO | WO 01/060693 A3 | 8/2001 | ........... B64D/45/00 |

OTHER PUBLICATIONS

Steve Kirsch, "How to Stop Commercial Air Hijackings Without Inconveniencing Air Travelers," from www.skirsch.com/politics/plane/disable.htm Dec. 20, 2001.

\* cited by examiner

Primary Examiner—Thomas G. Black
Assistant Examiner—Tuan C To

(57) ABSTRACT

An onboard portion of the system is located on an aircraft for monitoring a plurality of flight parameters and detecting a predetermined exceedence indicative of a potential problem. With regard to flight data, predetermined exceedences could include abnormal attitude, control surface actuator failure, low hydraulic fluid pressure, low fuel, near stall speed, excessive engine RPM, engine failure, cabin pressure loss, and so forth. With regard to voice data, predetermined exceedences could include excessive decibel levels, excessive static, overly long periods of silence, and other audible conditions indicative of cockpit intrusion. Flight data representative of the flight parameters is transmitted via RF signals upon the detection of the predetermined exceedence. A remote portion of the system receives the transmitted RF signals carrying the flight data and records the flight data for analysis.

18 Claims, 3 Drawing Sheets

AIRCRAFT FLIGHT AND VOICE DATA RECORDER SYSTEM AND METHOD

FIELD OF THE INVENTION

The present invention relates to aircraft, and more particularly, to systems and methods for recording and retrieving information about the performance of an aircraft and its crew during flight.

BACKGROUND OF THE INVENTION

Whenever an aircraft crashes, governmental authorities, aircraft manufacturers and the public have a keen interest in determining the cause of the crash. Commercial aircraft have long employed a flight data recorder (FDR) and a voice data recorder (VDR) to aid in the accident reconstruction and diagnostic process. The FDR records various flight parameters such as engine status, fuel status, airspeed, altitude, attitude and control settings. The VDR typically records the voice communications of the crew members, although it may also pick up other extraneous noise in the cockpit such as an explosion. The FDR and VDR have usually been provided in the form of on-board tape or disk recorders. They are typically packaged in an armored casing, sometimes called a "black box", which is located in the tail section of the aircraft. This gives them the greatest chance of surviving a crash and yielding their recorded data for analysis by experts, such as representatives of the National Transportation Safety Board (NTSB). More recently, large semi-conductor memories have been utilized in the FDR and VDR for storing all the information in order to eliminate moving mechanical parts and increase crash survivability.

Despite the improvements that have been made to the FDR and VDR themselves, it is frequently not possible to recover these devices. This can occur in the case of catastrophic crashes where the tail section is virtually disintegrated, or in the case of crashes at sea in deep water or crashes involving massive rubble. Moreover, even where the FDR and VDR themselves are actually recovered, they often undergo such severe physical damage that critical data cannot be read from these devices. Efforts to determine the precise cause of the crash are thus greatly hampered. Even where the FDR and the VDR can be recovered and the data read therefrom, the recovery and reading process often takes considerable time and effort. This is turn can delay the determination of the cause of the crash and the inspection and repair of key flight safety components on other aircraft, or the implementation of new air traffic control measures.

In order to overcome these deficiencies, it has been proposed to transmit the information collected by the on-board FDR and VDR via radio frequency (RF) data link while the aircraft is in flight. The information is then received by certain ground stations and can be reviewed. For example, U.S. Pat. No. 5,890,079 of Seymour Levine discloses a system that monitors many performance parameters and many aircraft operational parameters, and continuously broadcasts this information along with aircraft identification, audio, video, global positioning and altitude data, to a world wide two-way RF network. Such systems are very large scale and require that massive amounts of many kinds of data be continuously downloaded from all airborne commercial aircraft on a global basis. Besides being impractical from a cost standpoint, many technical problems prevent the deployment of these systems such as channel capacity, frequency spectrum availability, computing power, data conversion to useful format, installation complexity, maintenance, and so forth. To avoid these issues, pre-flight and post-flight downloading of data via direct physical connection, e.g. plugging in a laptop computer, has been proposed, but this completely ignores the loss of data from a crash resulting in an unrecoverable or severely damaged FDR and an unrecoverable VDR.

SUMMARY OF THE INVENTION

It is therefore the primary object of the present invention to provide an improved system and method for recording flight data and voice data from an aircraft during flight.

In accordance with one aspect of the present invention a system is provided for recording flight data from an aircraft during flight. An onboard portion of the system is located on an aircraft for monitoring a plurality of flight parameters and detecting a predetermined exceedence indicative of a potential problem. With regard to flight data, predetermined exceedences could include abnormal attitude, control surface actuator failure, low hydraulic fluid pressure, low fuel, near stall speed, excessive engine RPM, engine failure, cabin pressure loss, and so forth. With regard to voice data, predetermined exceedences could include excessive decibel levels, excessive static, overly long periods of silence, and other audible conditions indicative of cockpit intrusion. Flight data representative of the flight parameters is transmitted via RF signals upon the detection of the predetermined exceedence. A remote portion of the system receives the transmitted RF signals carrying the flight data and records the flight data for analysis.

In accordance with another aspect of the present invention a method is provided for recording flight data from an aircraft during flight. A plurality of flight parameters are monitored onboard an aircraft to detect a predetermined exceedence indicative of a potential problem. Upon the detection of the predetermined exceedence, RF signals are transmitted that carry flight data representative of the flight parameters. The transmitted RF signals carrying the flight data are received remote from the aircraft and the flight data is recorded for analysis.

DESCRIPTION OF THE PREFERRED EMBODIMENTS

Figure 1:
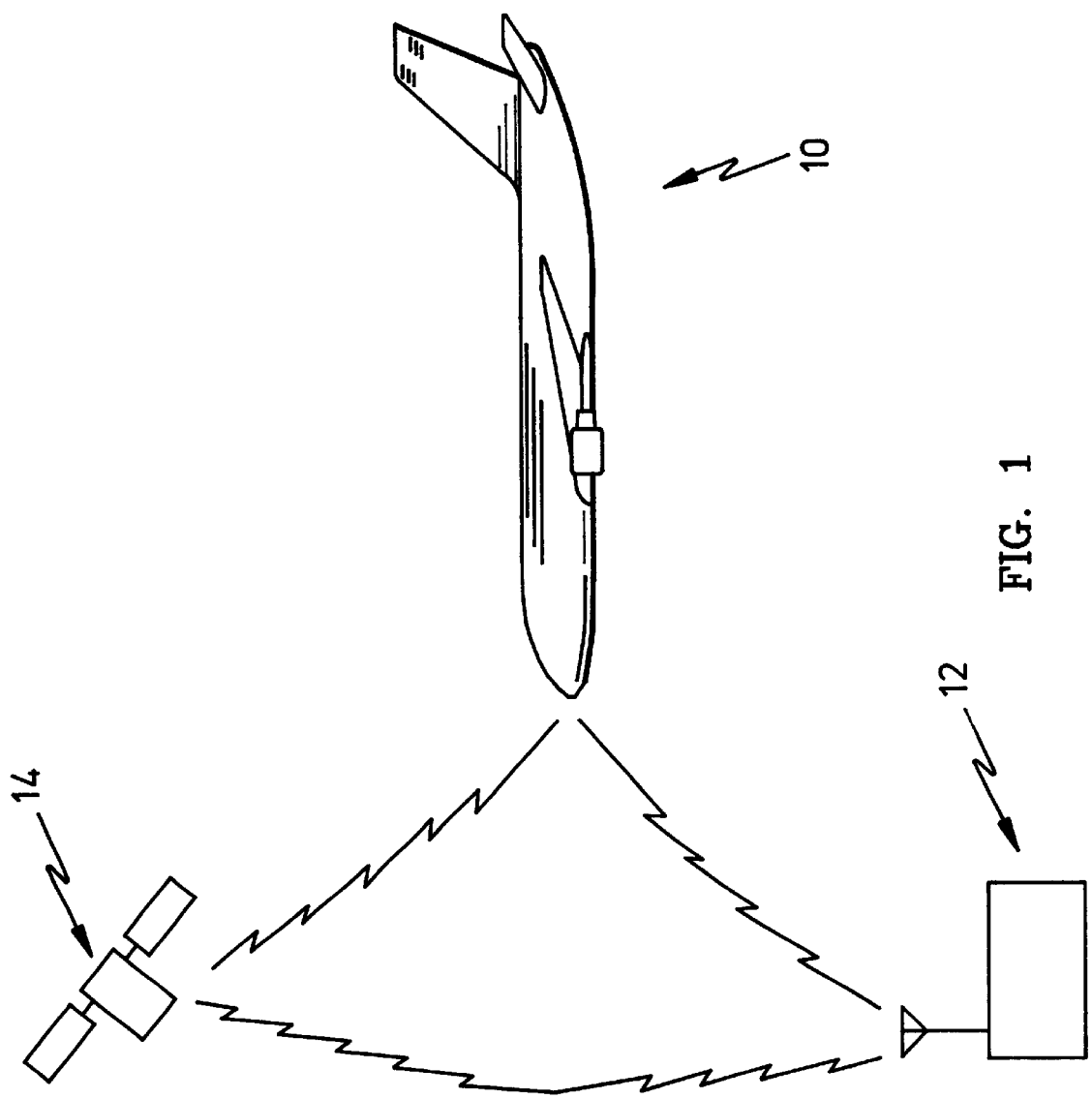
FIG. 1 is a diagrammatic illustration of an aircraft communicating with a ground station and a satellite in accordance with a preferred embodiment of the system of the present invention.

Referring to FIG. 1, a commercial aircraft 10, such as a Boeing 777 airliner, transmits flight data and voice data while in airborne directly to a remote ground station 12, or indirectly via a satellite 14. An airborne or onboard portion 16 (FIG. 2) of the preferred embodiment is carried in the cockpit of the aircraft 10 while a remote portion 18 (FIG. 3) of the preferred embodiment is located in the ground station 12 which is typically an air traffic control center (ATCC) operated by the Federal Aviation Administration (FAA). In accordance with my invention, many aircraft are equipped with similar onboard portions 16 and communicate with many similar ground portions 18 located in facilities spread throughout the world that monitor conventional aircraft radio traffic.

In the preferred embodiment of my system, recorded flight data and voice data are simultaneously down-linked, in real time, using a variety of RF connections, following the occurrence of various triggering events. As used herein, the term "flight data" refers to encoded signals representing various flight parameters, including, but not limited to, engine status, fuel status, airspeed, position, altitude, attitude and control settings. As used herein the term "voice data" refers to encoded signals representing the voice communications of the crew members, as well as other audible noise in the cockpit such as gunfire, explosions, screams, and other extraneous noises that might indicate either a hijacking or other personnel disturbance or an equipment failure.

The onboard portion 16 (FIG. 2) of the preferred embodiment of my system is designed to utilize existing RF transceivers in the commercial aircraft 10, without impacting their current usage. This enables my system to be reliably installed at minimum cost without disrupting the existing functionality of the existing onboard wireless communications systems. The remote portion 18 (FIG. 3) of the preferred embodiment of my system is designed to be implemented with a minimum of modifications to existing equipment in the ATCCs.

Figure 2:
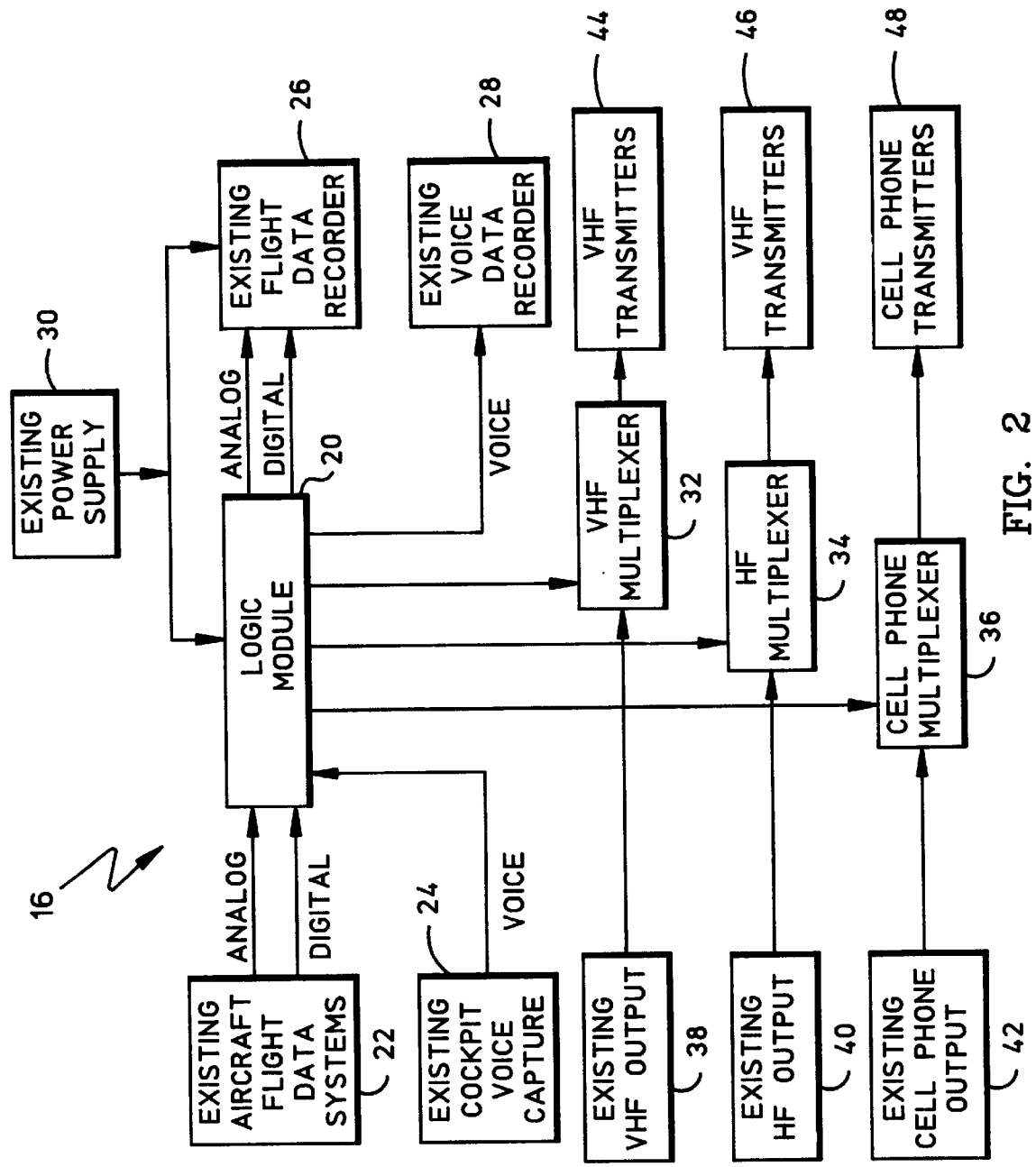
FIG. 2 is a functional block diagram of the onboard portion of the preferred embodiment.

Referring to FIG. 2, the onboard portion 16 of the preferred embodiment includes a logic module 20. The logic module 20 receives, in analog and digital form, flight data from the existing aircraft flight data systems 22 and voice data from the existing cockpit voice capture equipment 24 of the aircraft 10. This data is passed unaltered to the existing FDR 26 and VDR 28 of the aircraft 10. An existing highly reliable or redundant onboard power supply 30 powers the logic module 20 in addition to the FDR 26 and VDR 28. The logic module 20 continuously monitors the flight data and voice data for predetermined abnormal triggering events referred to herein as "exceedences." Each predetermined exceedence indicates a potential problem with the aircraft. With regard to flight data, predetermined exceedences could include abnormal attitude, control surface actuator failure, low hydraulic fluid pressure, low fuel, near stall speed, excessive engine RPM, engine failure, cabin pressure loss, and so forth. The onboard portion 16 preferably also transmits voice data along with flight data upon detecting a predetermined exceedence with respect to flight data parameters. However, the onboard portion 16 could also initiate transmission of flight data alone, or flight data and voice data, upon the detection of a predetermined exceedence with respect to voice data. With regard to voice data, predetermined exceedences could include excessive decibel levels, excessive static, overly long periods of silence, and other audible conditions indicative of cockpit intrusion.

When the logic module 20 detects a predetermined exceedence indicative of a potential problem with the aircraft itself or its human occupants, it initiates a continuous real time RF transfer of flight data and voice data to the remote portion 18 of the system. A VHF multiplexer 32, an HF multiplexer 34 and a cell phone multiplexer 36 are interposed between the existing VHF output 38, HF output 40 and cell phone output 42 on the one hand, and VHF transmitters 44, HF transmitters 46 and cell phone transmitters 48, on the other hand, respectively. The multiplexers 32, 34 and 36 preferably execute time division algorithms to enable sharing of channels so as not to interrupt other conventional uses of these same channels for transmitting normal communications information. The onboard portion 16 of the preferred embodiment may also utilize commonly clear channels, such as the emergency channel at 121.5 megahertz for down-linking the flight data and the voice data to the remote portion 18 of the preferred embodiment. The cell phone multiplexer 36 may initiate calls on currently clear channels, and if no clear channels are available, it can be programmed to capture a channel and use it as necessary. During this down-linking of flight data and voice data, the existing FDR 26 and VDR 28 continue to record flight data and voice data in their normal fashion. This provides redundancy in the event of a failure of the onboard portion 16 or ground portion 18 of the preferred embodiment.

The logic module 20 (FIG. 2) performs all the control, status and decision functions of the onboard portion 16 of the preferred embodiment. Various schemes for controlling channel selection and activation via the multiplexers 32, 34 and 36 can be implemented. Preferably the logic module 20 is also capable of making a logical determination of when to terminate the down-linking of flight data and voice data.

Figure 3:
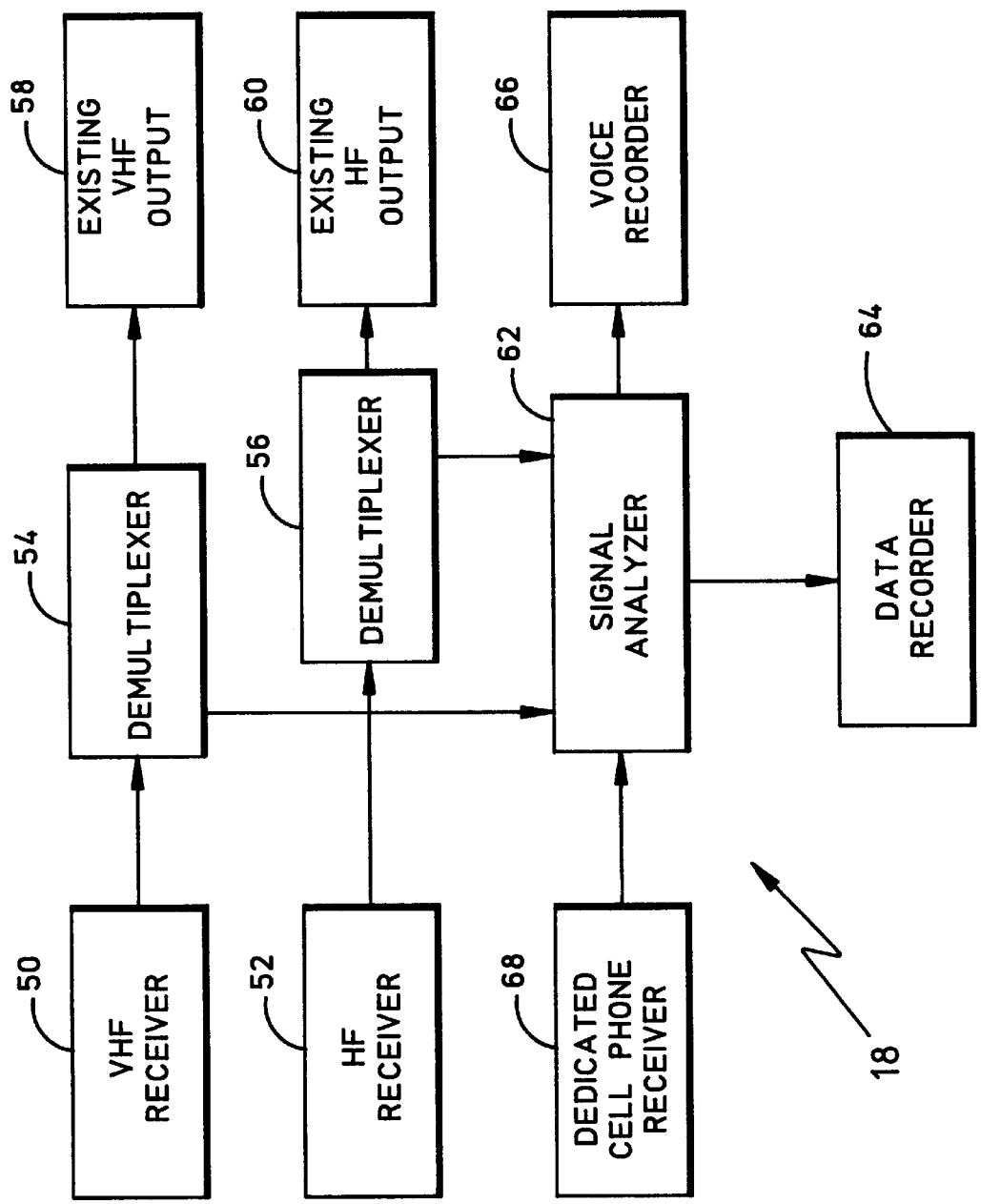
FIG. 3 is a functional block diagram of the remote portion of the preferred embodiment.

Referring to FIG. 3, the remote portion 18 of the preferred embodiment includes a VHF receiver 50 and an HF receiver 52 which monitor the appropriate channels for the RF signals that are transmitted by the onboard portion 16 of the preferred embodiment upon detection of a predetermined exceedence. Demultiplexer 54 and demultiplexer 56 demultiplex the signals received by the VHF receiver 50 and the HF receiver 52, respectively, with one output directed to existing VHF output 58 and existing HF output 60, respectively. The other outputs from the demultiplexer 54 and the demultiplexer 56 are directed to a signal analyzer 62. The signal analyzer 62 may take the form of a conventional personal computer (PC) which continuously monitors the signals received from the demultiplexer 54 and the demultiplexer 56 to detect a predetermined exceedence. Upon detection of an exceedence, the signal analyzer 62 converts the signals received thereby into a conventional flight data and voice data format for recording by a data recorder 64 and a voice recorder 66. Preferably the data recorder 64 and the voice recorder 66 take the form of a conventional FDR and a conventional VDR, respectively. A dedicated cell phone receiver 68 operates in similar fashion to the receivers 50 and 52, although not all ATCCs will have this capability. Upon receipt of a call, the cell phone receiver 68 activates the signal analyzer 62, which then commences decoding and recording of flight data and voice data transmitted via the cell phone network. If there is a crash, the flight data and the voice data recorded by the remote portion 18 of the preferred embodiment can be immediately analyzed to pinpoint the precise cause of the crash. This can take place regardless of whether or not the FDR 26 and VDR 28 of the aircraft 10 are ever recovered from the crash site, or if they are recovered, whether or not they are too severely damaged to reveal their critical pre-crash data.

Those skilled in the art will also appreciate that I have also provided a method for recording flight data from an aircraft during flight. A plurality of flight parameters are monitored onboard the aircraft 10 to detect a predetermined exceedence indicative of a potential problem. Upon the detection of the predetermined exceedence, RF signals are transmitted that carry flight data representative of the flight parameters and voice data. The transmitted RF signals carrying the flight data and voice data are received remote from the aircraft 10 and the flight data and voice data are recorded for later analysis. The transmitting step preferably involves multiplexing the flight data with normal communications information before transmitting both via the RF signals. The receiving and recording step preferably involves demultiplexing the received RF signals to separate the flight data from the normal communications information. The receiving and recording steps preferably further involve converting the flight data and the voice data into a conventional flight data format and a conventional voice data format and the recording of this converted data on an FDR and a VDR, respectively, which are similar to those onboard the aircraft 10. Finally, my method preferably terminates the transmission of flight data and voice data upon the detection of the absence of any exceedence for a predetermined time period.

While I have described preferred embodiments of my system and method, it will be understood by those skilled in the art that my invention can be modified in both arrangement and detail. For example, it is not necessary to transmit and record voice data along with flight data. The remote portion 18 of the preferred embodiment need not be ground based but could be located on a ship, satellite, blimp or other aircraft. The flight data and voice data could be relayed to the remote portion 18 via RF repeater stations, public telephone networks, land lines, fiber optic networks and laser based line of sight communications systems, alone, or on combination with satellite data links. The remote portion 18 of the preferred embodiment need not also detect exceedences, but can instead record any flight data and voice data transmitted by the remote portion 16 on the assumption that it has already detected an exceedence. The system can utilize existing FDRs and VDRs, existing VHF and HF transceivers and existing onboard cell phone transceivers, or dedicated components performing these functions can be provided. Many of the functions of the airborne and remote portions of the preferred embodiment indicated by the blocks in FIGS. 2 and 3 can be combined or further separated, and can be carried out by microprocessors, software, firmware, or combinations of the same, or by application specific integrated circuits (ASICs) where advantageous. The design of the logic module 20 can accommodate the later upgrades to achieve additional flight data monitoring by providing spare analog and digital input channels. Both the onboard portion 16 and the remote portion 18 of the preferred embodiment could be re-programmable to accommodate the addition of new features and capabilities. Therefore, the protection afforded my invention should only be limited in accordance with the scope of the following claims.

I claim:

1. A system for recording flight data from an aircraft during flight, comprising:
    means onboard an aircraft for monitoring a plurality of flight parameters and detecting a predetermined exceedence indicative of a potential problem;
    RF means for transmitting signals carrying flight data representative of the flight parameters upon the detection of the predetermined exceedence; and
    means remote from the aircraft for receiving the transmitted signals and recording the flight data for analysis including a demultiplexer interposed between a VHF receiver and an existing VHF output.

2. The system of claim 1 wherein the receiving and recording means converts the transmitted flight data into a predetermined flight data recorder format before recording the flight data.

3. The system of claim 1 wherein the RF transmitting means also transmits voice data representative of voice communications and other audible noise in the aircraft cockpit upon the detection of the predetermined exceedence and the system further includes means remote from the aircraft for receiving the transmitted voice data and recording the voice data for analysis.

4. The system of claim 1 wherein the RF means includes a VHF multiplexer interposed between an existing VHF output and a VHF transmitter.

5. The system of claim 1 wherein the RF means includes a HF multiplexer interposed between an existing HF output and a HF transmitter.

6. The system of claim 1 wherein the RF means includes a cell phone multiplexer interposed between an existing cell phone output and a cell phone transmitter.

7. The system of claim 1 wherein the receiving means includes a demultiplexer interposed between an HF receiver and an existing HF output.

8. The system of claim 1 wherein the receiving means includes a cell phone receiver.

9. The system of claim 1 wherein the receiving means includes a signal analyzer that converts the transmitted signals into a conventional flight data format for recording by a conventional flight data recorder.

10. A method for recording flight data from an aircraft during flight, comprising the steps of:
    monitoring a plurality of flight parameters onboard an aircraft and detecting a predetermined exceedence indicative of a potential problem;
    multiplexing flight data representative of the flight parameters with normal communications information;
    transmitting via RF signals the multiplexed flight data and normal communications information upon the detection of the predetermined exceedence; and
    receiving the transmitted RF signals remote from the aircraft, demultiplexing the received RF signals to separate the flight data from the normal communications information, and recording the flight data for analysis.

11. The method of claim 10 wherein the predetermined exceedence is selected from the group consisting of abnormal attitude, control surface actuator failure, low hydraulic fluid pressure, low fuel, near stall speed, engine failure and cabin pressure loss.

12. The method of claim 10 and further comprising the step of recording the normal communications information for analysis.

13. The method of claim 10 and further comprising the step of detecting a voice data exceedence selected from the group consisting of excessive decibel levels, excessive static, overly long periods of silence, and other audible conditions indicative of cockpit intrusion, and transmitting the flight data upon the detection of the predetermined voice data exceedence.

14. The method of claim 10 wherein the receiving and recording step further involves the step of converting the flight data into a conventional flight data format and recording the converted flight data with a first flight data recorder of the same type as a second flight data recorder onboard the aircraft.

15. The method of claim 10 wherein the step of receiving and recording further involves the step of detecting an exceedence in the received flight data.

16. A system for recording flight data from an aircraft during flight, comprising:
    means onboard an aircraft for monitoring a plurality of flight parameters and detecting a predetermined exceedence indicative of a potential problem;
    RF means for transmitting signals carrying flight data representative of the flight parameters and voice data representative of voice communications and other audible noise in the aircraft cockpit upon the detection of the predetermined exceedence, the RF means including a multiplexer interposed between a first existing RF output and an RF transmitter; and means remote from the aircraft for receiving the transmitted signals and recording the flight data and the voice data for analysis, including a demultiplexer interposed between an RF receiver and a second existing RF output and a signal analyzer that converts the flight data and the voice data into a conventional flight data format and a conventional voice data format, and an FDR and a VDR that record the converted flight data and voice data.

17. A system for recording flight data from an aircraft during flight, comprising:

means onboard an aircraft for monitoring a plurality of flight parameters and detecting a predetermined exceedence indicative of a potential problem;

RF means for transmitting signals carrying flight data representative of the flight parameters upon the detection of the predetermined exceedence; and means remote from the aircraft for receiving the transmitted signals and recording the flight data for analysis including a demultiplexer interposed between an HF receiver and an existing HF output.

18. A system for recording flight data from an aircraft during flight, comprising:

means onboard an aircraft for monitoring a plurality of flight parameters and detecting a predetermined exceedence indicative of a potential problem;

RF means for transmitting signals carrying flight data representative of the flight parameters upon the detection of the predetermined exceedence; and means, including a cell phone receiver, remote from the aircraft for receiving the transmitted signals and recording the flight data for analysis.

* * * * *